(12) United States Patent
Kim

(10) Patent No.: US 11,104,264 B2
(45) Date of Patent: Aug. 31, 2021

(54) CAP-TYPE VENT

(71) Applicant: AMOGREENTECH CO., LTD., Gimpo-si (KR)

(72) Inventor: Jong-Uk Kim, Bucheon-si (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 210 days.

(21) Appl. No.: 16/480,809

(22) PCT Filed: Dec. 15, 2017

(86) PCT No.: PCT/KR2017/014831
§ 371 (c)(1),
(2) Date: Jul. 25, 2019

(87) PCT Pub. No.: WO2018/139760
PCT Pub. Date: Aug. 2, 2018

(65) Prior Publication Data
US 2019/0389363 A1 Dec. 26, 2019

(30) Foreign Application Priority Data
Jan. 25, 2017 (KR) .................. 10-2017-0011781

(51) Int. Cl.
*B60Q 1/00* (2006.01)
*F21S 45/33* (2018.01)
*D04H 13/00* (2006.01)

(52) U.S. Cl.
CPC .......... *B60Q 1/0005* (2013.01); *D04H 13/00* (2013.01); *F21S 45/33* (2018.01)

(58) Field of Classification Search
CPC ........ B60Q 1/0005; F21S 45/33; D04H 13/00
See application file for complete search history.

(56) References Cited

U.S. PATENT DOCUMENTS

2013/0139484 A1    6/2013  Furuyama et al.
2015/0062940 A1*   3/2015  Scagliarini ............. F21V 31/03
                                                       362/487

FOREIGN PATENT DOCUMENTS

| JP | 2015-32476 A | 2/2015 |
| KR | 20080077371 A | 8/2008 |
| KR | 10-2013-0042741 A | 4/2013 |
| KR | 10-1278207 B1 | 7/2013 |

(Continued)

*Primary Examiner* — Thomas M Sember
(74) *Attorney, Agent, or Firm* — CL Intellectual LLC

(57) ABSTRACT

Provided is a cap-type vent having a porous waterproof air-permeable sheet inserted and mounted in a cap housing having fixing ribs formed therein, and fixing the waterproof air-permeable sheet by a supporting member made from an elastic material. The provided cap-type vent comprises a supporting member having one end coupled to an object, a waterproof air-permeable sheet disposed at the other end of the supporting member; and a cap housing formed in a cup shape having an opening formed at one end of the cup shape, and having the supporting member and the waterproof air-permeable sheet inserted through the opening, the supporting member is formed with an air circulation hole formed by penetrating the supporting member, and the inner side surface of the cap housing is formed with a fixing rib is configured to fix the supporting member by contacting the outer sidewall of the supporting member.

8 Claims, 7 Drawing Sheets

(56) References Cited

FOREIGN PATENT DOCUMENTS

| | | | |
|---|---|---|---|
| KR | 2014-0049903 | A | 4/2014 |
| KR | 10-1434868 | B1 | 11/2014 |
| KR | 2015-0002764 | A | 1/2015 |

* cited by examiner

CAP-TYPE VENT

CROSS-REFERENCE TO RELATED APPLICATIONS

This application is a National Stage of International patent application PCT/KR2017/014831, filed on Dec. 15, 2017, which claims priority to foreign Korean patent application No. 10-2017-0011781 filed on Jan. 25, 2017, the disclosures of which are incorporated by reference in their entirety.

FIELD OF THE INVENTION

The present disclosure relates to a cap-type vent, and more particularly, to a cap-type vent, which can be installed on a headlamp and an Electric Control Unit (ECU), etc. installed in a vehicle.

BACKGROUND

Generally, a headlamp for a vehicle has a form in which a lens is installed on the front surface of a housing, a reflector is installed on the inner rear of the housing, and a bulb is installed on the inner central rear of the reflector.

When the headlamp for the vehicle is operated, the inner air around it is heated due to the heat-generation of the bulb to increase the temperature. However, since the outer surface of the lens is relatively low in temperature, moisture condenses on the inner surface of the lens to generate moisture.

Conventionally, a vent hole is formed on the rear surface of the housing in order to solve a problem that moisture is generated on the inner surface of the lens. The headlamp for the vehicle solves the problem of moisture generation by discharging the inner air whose temperature increases due to the heat-generation of the bulb to the outside through the vent hole.

The conventional headlamp for the vehicle has a problem that foreign matter, moisture, etc., generated during traveling through the vent hole are flowed into to pollute the interior. At this time, the headlamp for the vehicle has a problem that the bulb breaks down and the brightness reduces in case of the inner pollution.

Therefore, the conventional headlamp for the vehicle mounts a cap-type vent in the vent hole to discharge the inner air to the outside, thereby preventing foreign matter, moisture, etc. from flowing into from the outside.

For example, referring to FIGS. 1 and 2, the conventional cap-type vent is composed of a cylindrical-shaped (i.e., a cup-shaped) housing 10 having one side opened, and a vent member 20 mounted inside the housing 10. At this time, the vent member 20 is formed in a cylindrical shape (i.e., cup shape) having one side opened, and a plurality of protrusions 22 for forming an air passage are formed on the outside. The cap-type vent is fastened to the vent hole of the headlamp for the vehicle in a state where the vent member 20 has been inserted and mounted inside the housing 10.

However, there is a problem in the conventional cap-type vent in that since the vent member 20 is formed in a cup shape, it is difficult to simplify the assembling process because the vent member 20 is required to be mounted to fit the direction thereof when being coupled to the housing 10.

In addition, there is a problem in the conventional cap-type vent in that since the vent member 20 is formed in a cup shape, the vent performance is reduced due to a change in a material and a change in a shape in the high-temperature and high-humidity condition. That is, in the conventional cap-type vent, the inner air of the headlamp for vehicle is not discharged to the outside due to the change in the material of the vent member 20, or a space is formed between the housing 10 and the vent member 20 due to the change in the shape of the vent member 20, such that foreign matter, moisture, etc. are flowed into.

SUMMARY OF THE INVENTION

The present disclosure is intended to solve the above problems, and an object of the present disclosure is to provide a cap-type vent, which inserts and mounts a porous waterproof air-permeable sheet into a cap housing having a fixing rib formed therein, and fixes the waterproof air-permeable sheet through a supporting member made of an elastic material.

For achieving the object, a cap-type vent according to an embodiment of the present disclosure includes a supporting member having one end configured to be coupled to an object to be applied, a waterproof air-permeable sheet disposed at the other end of the supporting member, and a cap housing formed in a cup shape having an opening formed at one end thereof, the supporting member and the waterproof air-permeable sheet being inserted through the opening, and the supporting member is formed with an air circulation hole penetrating the supporting member, and the inner side surface of the cap housing is formed with a fixing rib for fixing the supporting member by contacting an outer sidewall of the supporting member.

At this time, a vent hole of the object is inserted into one end of the air circulation hole, the waterproof air-permeable sheet is disposed at the other end of the air circulation hole.

The supporting member can be one selected from ethylene propylene rubber (EPDM), thermoplastic elastomer (TPE), and silicone, and can be a pipe shape having both ends opened.

The waterproof air-permeable sheet can be non-woven fabric including one selected from polyethylene terephthalate (PET), polypropylene (PP), polyethylene (PE), and nylon.

The fixing rib can be protruded inwards from the inner side surface of the cap housing to fix the supporting member.

A plurality of fixing ribs can be formed on the inner side surface of the cap housing, the fixing rib can be spaced apart from another fixing rib to form a spacing space, and the spacing space can form an air passage.

An opening is formed at one end of the fixing rib to form an air pocket into which the outer air flows.

The cap housing can include a guide protrusion formed on the inner bottom surface of the cap housing, and the guide protrusion can separate the waterproof air-permeable sheet from the inner bottom surface of the cap housing to form an air passage.

According to the present disclosure, it is possible for the cap-type vent to have the plurality of fixing ribs formed on the inner surface of the cap housing, thereby reinforcing the rigidity of the cap housing by forming a structure of reinforcing the thickness and mitigating the shock thereof.

In addition, it is possible for the cap-type vent to have the opening formed at one end of the fixing rib, thereby lowering the temperature of the cap-type vent through the air cooling because the outer air of the headlamp for the vehicle is flowed into.

It is possible for the cap-type vent to form the supporting member with a rubber material of the pipe shape, and fix the waterproof air-permeable sheet to the cap housing through the supporting member, thereby preventing the material and the shape of the vent member (i.e., the supporting member and the waterproof air-permeable sheet) from being deformed in the high-temperature and high-humidity condition.

In addition, it is possible for the cap-type vent to prevent the material and the shape of the vent member from being deformed, thereby uniformly keeping the air circulation performance of the headlamp for the vehicle, and preventing the spacing from occurring between the housing and the vent member (i.e., the waterproof air-permeable sheet and the supporting member) to prevent foreign matter, moisture, etc. from being flowed into.

In addition, it is possible for the cap-type vent to form the supporting member in the pipe shape having both ends opened, thereby removing the assembling directionality to simplify the assembling process.

DETAILED DESCRIPTION

Figure 1:
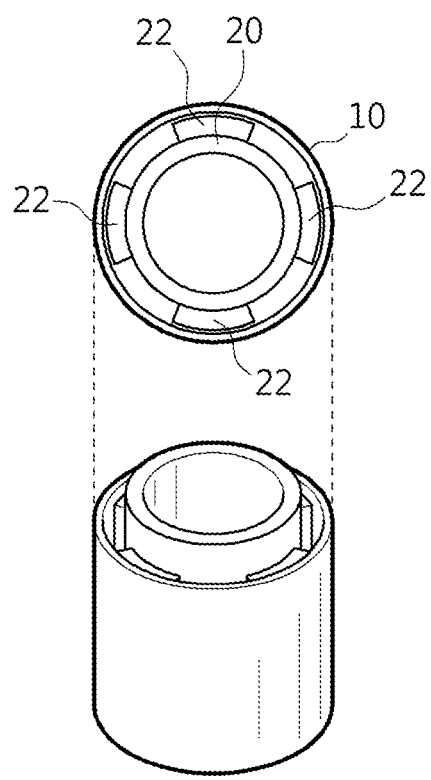
FIGS. 1 and 2 are diagrams for explaining a conventional cap-type vent.
Figure 2:
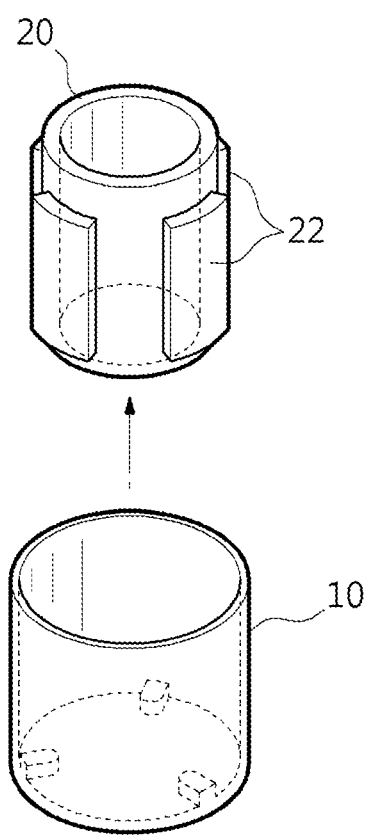

Hereinafter, the most preferred embodiment of the present disclosure will be described in detail with reference to the accompanying drawings so that those skilled in the art to which the present disclosure pertains can easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Hereinafter, although the cap-type vent has been described as being coupled to the headlamp for the vehicle as an example in order to easily explain the present disclosure, the cap-type vent is not limited thereto and can be applied to various technical fields such as an electronic device and a chemical container installed on the outdoor.

Figure 3:
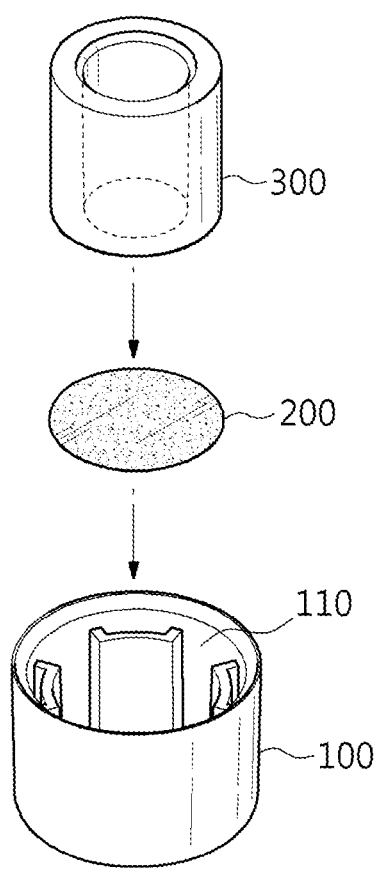
FIGS. 3 and 4 are diagrams for explaining a cap-type vent according to an embodiment of the present disclosure.
Figure 4:
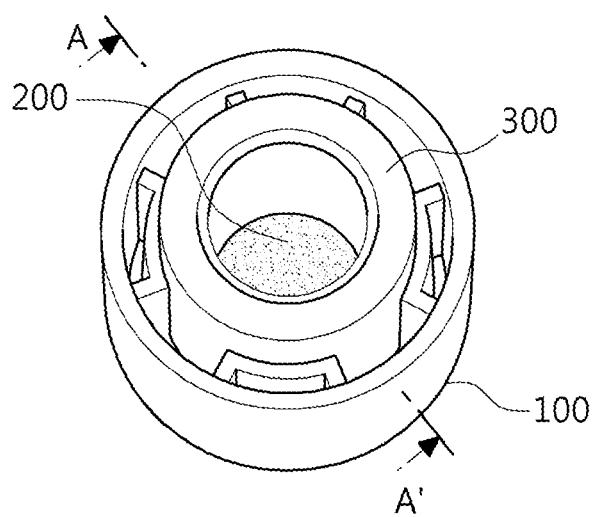

Referring to FIGS. 3 and 4, a cap-type vent according to an embodiment of the present disclosure includes a cap housing 100, a waterproof air-permeable sheet 200, and a supporting member 300.

The cap housing 100 is formed in a cylindrical shape (i.e., cup shape) having an opening 110 formed at one end thereof. The supporting member 300 and the waterproof air-permeable sheet 200 is inserted and mounted into the inside of the cap housing 100 through the opening 110. At this time, the cap housing 100 is made of a thermoplastic resin such as polypropylene.

Figure 5:
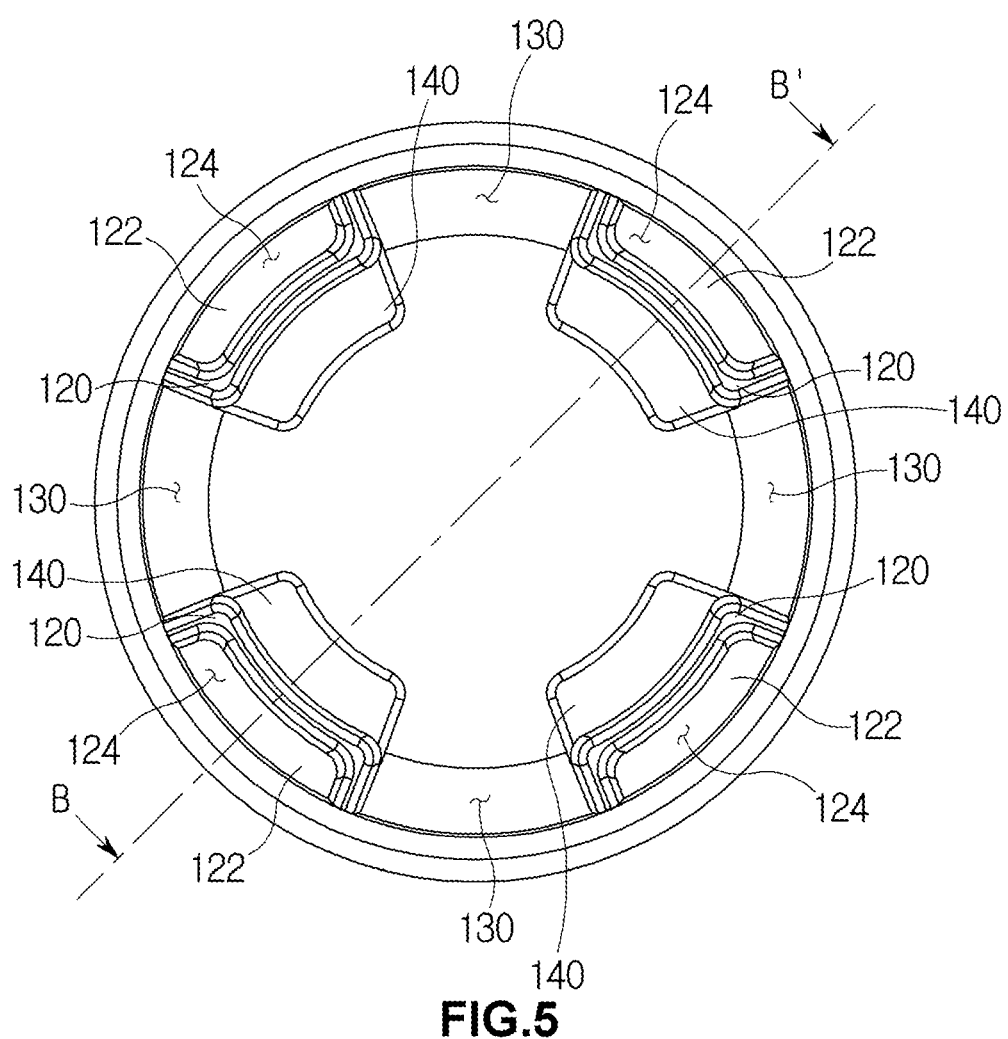
FIGS. 5 and 6 are diagrams for explaining a cap housing of FIG. 2.
Figure 6:
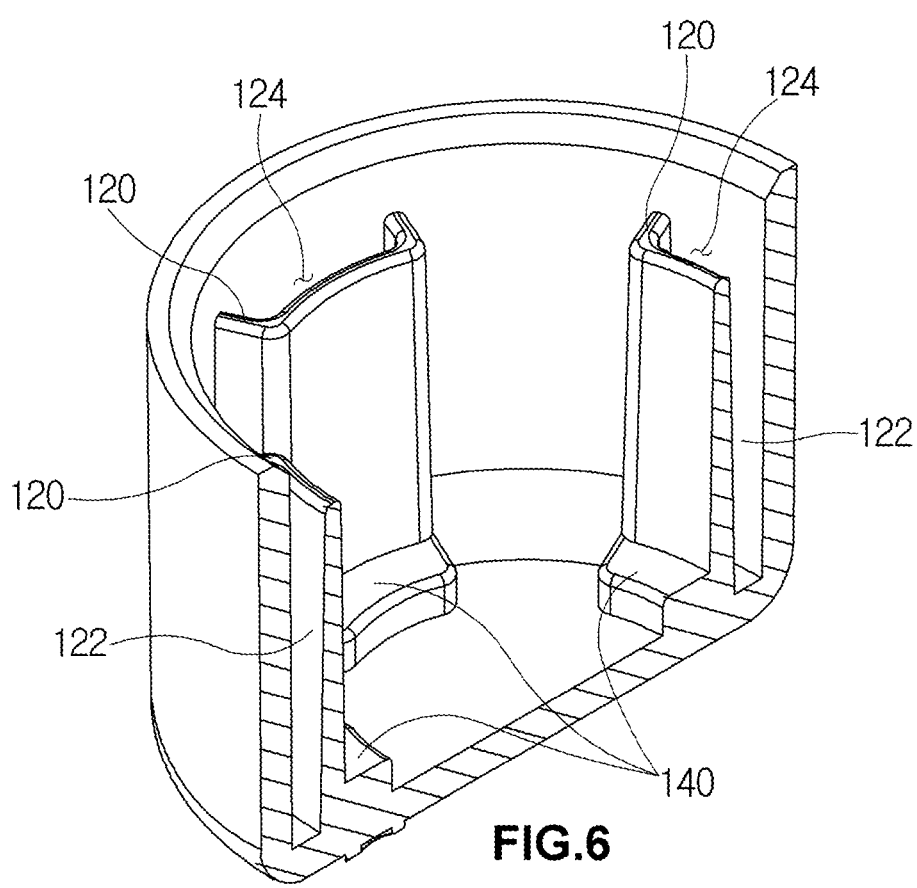

Referring to FIGS. 5 and 6, the cap housing 100 has a plurality of fixing ribs 120 and guide protrusions 140 formed therein. Herein, FIG. 6 shows a cut-surface of the cap housing 100 taken along the line B and B' of FIG. 5.

The fixing rib 120 is formed on the inner sidewall of the cap housing 100 to fix the supporting member 300 inserted into and mounted on the cap housing 100. At this time, the fixing rib 120 is formed integrally with the cap housing 100, and formed to be protruded inwards from the inner circumferential sidewall of the cap housing 100.

The fixing rib 120 contacts the outer circumference of the supporting member 300 inserted into the cap housing 100 to fix the supporting member 300. For this purpose, the fixing rib 120 has one surface contacting the supporting member 300 formed in a round shape. At this time, when the supporting member 300 is inserted into and mounted on the cap housing 100, the space between the fixing rib 120 and another fixing rib 120 forms an air passage 130 for transferring the inner air discharged from the headlamp for the vehicle.

The fixing rib 120 has an air pocket 122 for air cooling formed therein. That is, the fixing rib 120 has an empty space formed between the cap housings 100 to form the air pocket 122. At this time, the fixing rib 120 has an opening 124 formed thereon in the same direction as the cap housing 100, and the outer air flows into the air pocket 122 through the opening 124 to perform air-cooling. Herein, the end portion of the fixing rib 120 (i.e., the end portion where the opening 124 has been formed) is disposed further inwards than the end portion of the cap housing 100 (i.e., the end portion where the opening 110 has been formed).

The fixing rib 120 reinforces the rigidity of the cap housing 100. That is, when the cap housing 100 is formed in a cylindrical shape having an empty interior, damage due to shock and vibration occurs. The fixing rib 120 is formed to be protruded from the inside of the cap housing 100 to form a structure of reinforcing the thickness and mitigating the shock of the cap housing 100, thereby reinforcing the rigidity of the cap housing 100.

A guide protrusion 140 is formed to be protruded from the inner bottom surface of the cap housing 100 in the direction of the opening 110. The surface of the guide protrusion 140 contacts one surface of the waterproof air-permeable sheet 200 inserted into and mounted on the cap housing 100.

Therefore, the guide protrusion 140 forms a spacing space between the bottom surface of the cap housing 100 and the waterproof air-permeable sheet 200. At this time, the spacing space between the bottom surface of the cap housing 100 and the waterproof air-permeable sheet 200 forms the air passage 130 for circulating the inner air and the outer air of the headlamp for the vehicle. Herein, one side of the guide protrusion 140 can be connected to one surface of the fixing rib 120 to form the air passage 130 through which air smoothly circulates.

The waterproof air-permeable sheet 200 is inserted and mounted inside the cap housing 100. The waterproof air-permeable sheet 200 circulates the inner air and the outer air of the headlamp for the vehicle, and blocks foreign matter, moisture, etc. flowing into from the outside from flowing into the headlamp for the vehicle.

The waterproof air-permeable sheet 200 is stacked on the surface of the guide protrusion 140 formed on the bottom surface of the cap housing 100. That is, the waterproof air-permeable sheet 200 is stacked on the upper portion of the guide protrusion 140 so that one surface thereof contacts the surface of the guide protrusion 140. The other surface of the waterproof air-permeable sheet 200 is supported by contacting the end portion of the supporting member 300. Therefore, the waterproof air-permeable sheet 200 forms the air passage 130 through the spacing space between the cap housings 100.

The waterproof air-permeable sheet 200 is made of a porous material having a plurality of pores formed for air circulation. At this time, when the pores are formed too much, moisture can flow into the headlamp for the vehicle, such that the waterproof air-permeable sheet 200 preferably forms pores enough to allow air to pass therethrough while blocking the inflow of moisture.

For example, the waterproof air-permeable sheet 200 can be made of a porous material having a plurality of pores such as non-woven fabric made of a material such as polyethylene terephthalate (PET), polypropylene (PP), polyethylene (PE), or nylon, formed therein.

For another example, the waterproof air-permeable sheet 200 can also be formed of a porous membrane formed through electrospinning. That is, the waterproof air-permeable sheet 200 can be manufactured by forming a polymer material layer on a web through the electrospinning.

Herein, the polymer material can use aromatic polyesters such as polyamide, polyimide, polyamideimide, poly (meta-phenylene isophthalamide), polysulfone, polyetherketone, polyetherimide, polyethylene terephthalate, polytrimethylene terephthalate, and polyethylene naphthalate, polyphosphazenes such as polytetrafluoroethylene, polydiphenoxyphosphazene, and poly {bis[2-(2-methoxyethoxy) phosphazene]}, polyurethane copolymer containing polyurethane and polyether urethane, cellulose acetate, cellulose acetate butylate, cellulose acetate propionate, etc. In addition, it can also be made of polyvinylidene fluoride (PVDF), poly (vinylidene fluoride-co-hexafluoropropylene), perfluoropolymers, polyvinyl chloride or polyvinylidene chloride and copolymer thereof and polyethylene glycol derivatives containing polyethylene glycol dialkyl ether and polyethylene glycol dialkyl ester, polyoxides containing poly (oxymethylene-oligo-oxyethylene), polyethylene oxide and polypropylene oxide, polyvinyl acetate, poly (vinylpyrrolidone-vinyl acetate), polystyrene and polystyrene acrylonitrile copolymer, polyacrylonitrile, polyacrylonitrile copolymer containing polyacrylonitrile methyl methacrylate copolymer, polymethyl methacrylate, polymethyl methacrylate copolymer, and a mixture thereof.

Figure 7:
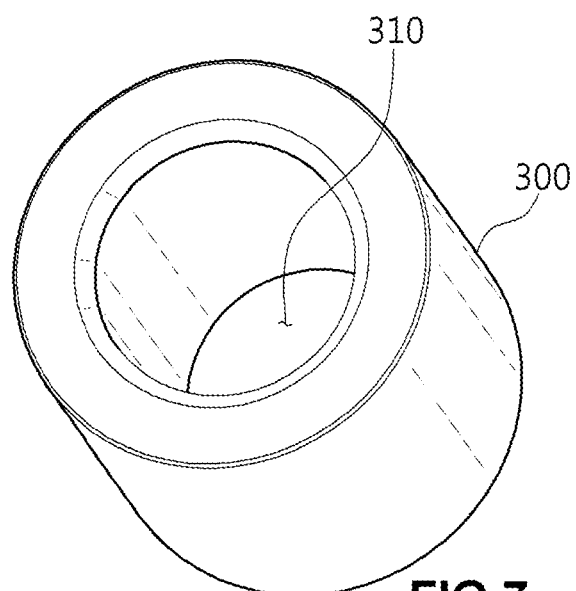
FIGS. 7 and 8 are diagrams for explaining a supporting member of FIG. 2.

The supporting member 300 is inserted into and mounted on the cap housing 100 to support the waterproof air-permeable sheet 200 so as not to move. Referring to FIG. 7, the supporting member 300 is formed in a pipe shape having an air circulation hole 310 for air circulation formed therein. That is, as the air circulation hole 310 is formed by penetrating the supporting member 300, the supporting member 300 is formed in the pipe shape having both ends opened.

The supporting member 300 is fixed by contacting the fixing rib 120 when being mounted on the cap housing 100. That is, the supporting member 300 is fixed by contacting the fixing rib 120 as one end portion thereof is inserted into the cap housing 100. At this time, the supporting member 300 is fixed by contacting one surface of the fixing rib 120 formed in a round shape.

One end portion of the supporting member 300 contacts the other surface of the waterproof air-permeable sheet 200 mounted on the cap housing 100 to support so that the waterproof air-permeable sheet 200 is fixed to the cap housing 100. The other end portion of the supporting member 300 is disposed further outwards than the end portion of the cap housing 100 (i.e., the end portion where the opening 110 has been formed).

The supporting member 300 is made of a rubber material having elasticity. For example, the supporting member 300 can be made of a material that has no (or few) deformation at a high temperature, such as ethylene propylene rubber (EPDM), thermoplastic elastomer (TPE), or silicone.

The other end portion of the supporting member 300 is coupled so that the vent hole 400 of the headlamp for the vehicle is inserted into the air circulation hole 310 to form the air passage 130 for circulating the inner air and the outer air of the headlamp for the vehicle.

Figure 8:
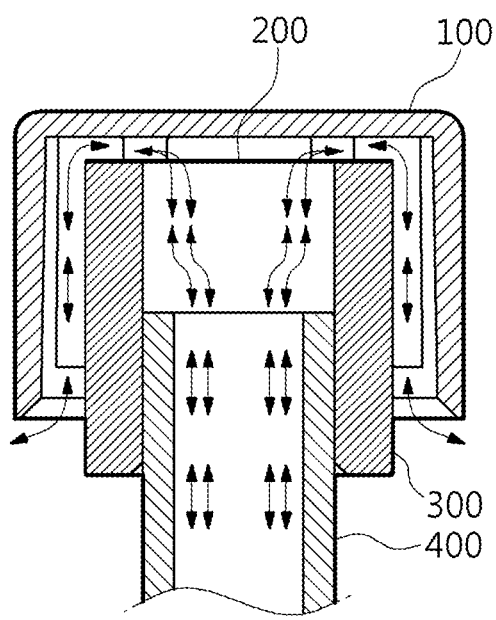

FIG. 8 shows a cut-surface of the cap-type vent taken along the line A and A' of FIG. 5 in a state where the vent hole 400 of the headlamp for the vehicle has been fastened. Referring to FIG. 8, the inner air of the headlamp for the vehicle is discharged through the vent hole 400, and the discharged inner air is discharged to the waterproof air-permeable sheet 200 through the air circulation hole 310 of the supporting member 300. The discharged inner air is discharged to the outside through the air passage 130 (i.e., a space between the fixing rib 120 and another fixing rib 120) of the cap housing 100.

The outer air of the headlamp for the vehicle is flowed into through the air passage 130 of the cap housing 100. The inflowing outer air flows into the air circulation hole 310 of the supporting member 300 through the waterproof air-permeable sheet 200. The inflowing outer air flows into the headlamp for the vehicle through the vent hole 400.

At this time, the outer air is flowed into through the opening 124 formed in the fixing rib 120 of the cap housing 100 to air-cool the cap-type vent.

As described above, although preferred embodiments of the present disclosure have been described, it is to be understood that they can be modified into various forms, and various modifications and changes thereof can be embodied by those skilled in the art without departing from the claims of the present disclosure.

The invention claimed is:

1. A cap-type vent, comprising:
a supporting member having one end configured to be coupled to an object to be applied;
a waterproof air-permeable sheet disposed at an other end of the supporting member; and
a cap housing formed in a cup shape having an opening formed at one end thereof, the supporting member and the waterproof air-permeable sheet being inserted through the opening,
wherein the supporting member is formed with an air circulation hole penetrating the supporting member, and
wherein the inner side surface of the cap housing is formed with a fixing rib for fixing the supporting member by contacting an outer sidewall of the supporting member,
wherein an air pocket is formed in the fixing rib to be surrounded by the inner side surface of the cap housing and the fixing rib,
wherein an opening is formed at one end of the fixing rib to allow the outer air to flow into the air pocket, and the other end of the fixing rib is connected to a bottom surface of the cap housing.

2. The cap-type vent of claim 1, wherein a vent hole of the object is inserted into one end of the air circulation hole, and the waterproof air-permeable sheet is disposed at the other end of the air circulation hole.

3. The cap-type vent of claim 1, wherein the supporting member is one selected from ethylene propylene rubber (EPDM), thermoplastic elastomer (TPE), and silicone.

4. The cap-type vent of claim 1, wherein the supporting member is a pipe shape having both ends opened.

5. The cap-type vent of claim 1, wherein the waterproof air-permeable sheet is non-woven fabric comprising one selected from polyethylene terephthalate (PET), polypropylene (PP), polyethylene (PE), and nylon.

6. The cap-type vent of claim 1, wherein the fixing rib is protruded inwards from the inner side surface of the cap housing to fix the supporting member.

7. The cap-type vent of claim 1, wherein a plurality of fixing ribs are formed on the inner side surface of the cap housing, and wherein the fixing rib is spaced apart from another fixing rib to form a spacing space, and the spacing space forms an air passage.

8. The cap-type vent of claim 1, wherein the cap housing comprises a guide protrusion formed on the inner bottom surface of the cap housing, and wherein the guide protrusion separates the waterproof air-permeable sheet from the inner bottom surface of the cap housing to form an air passage.

\* \* \* \* \*